July 30, 1963  P. IVANCHICH  3,099,171
AUTOMATIC TRANSMISSION
Filed Nov. 2, 1959  2 Sheets-Sheet 1
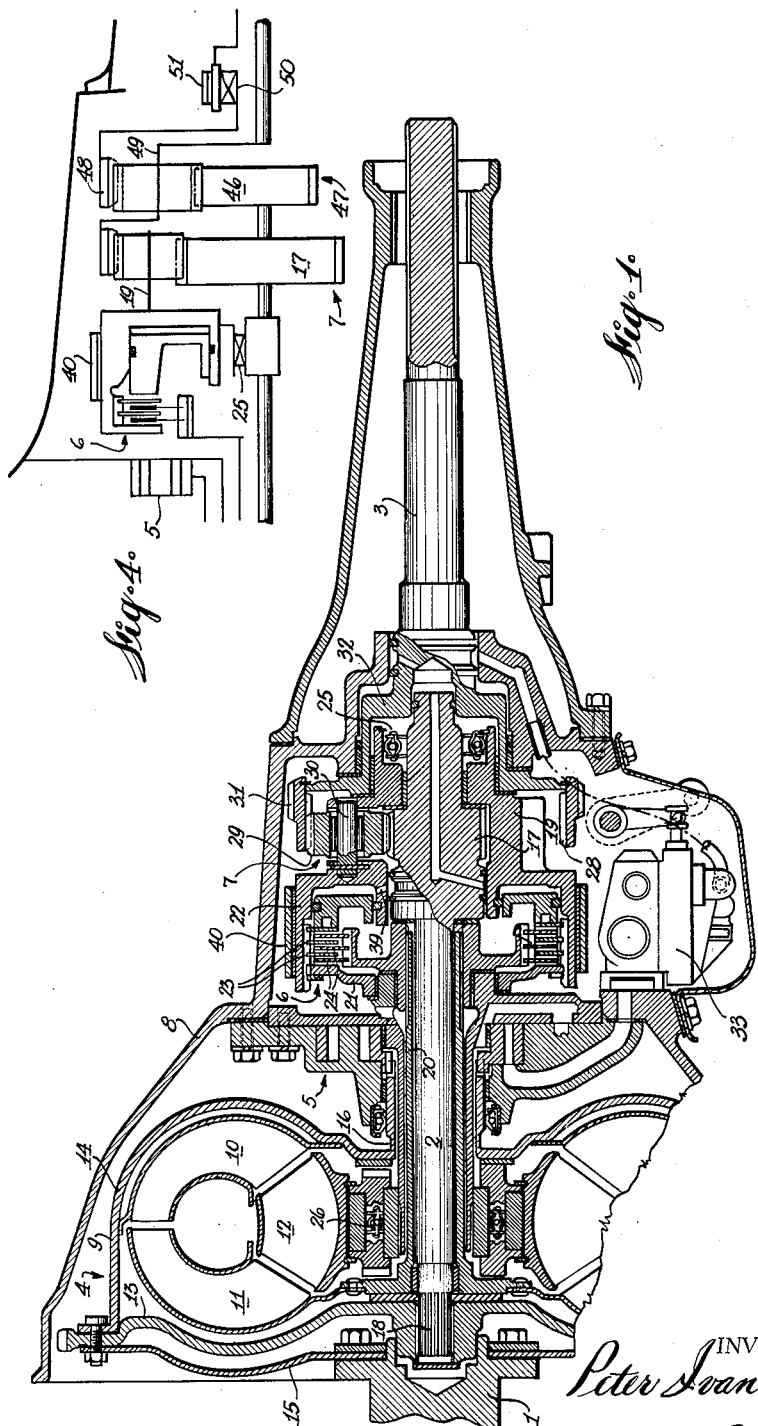
INVENTOR
Peter Ivanchich
BY Alex. E. MacRae
ATTORNEY

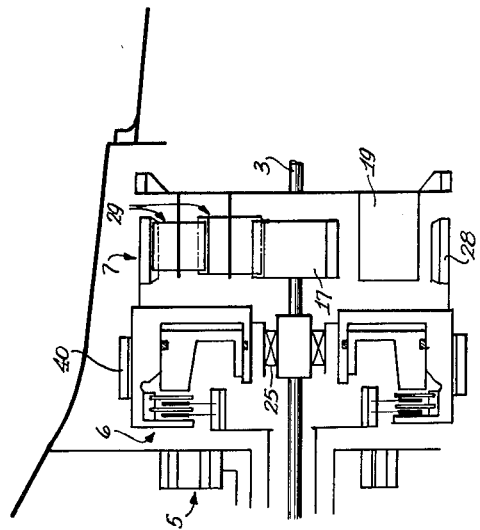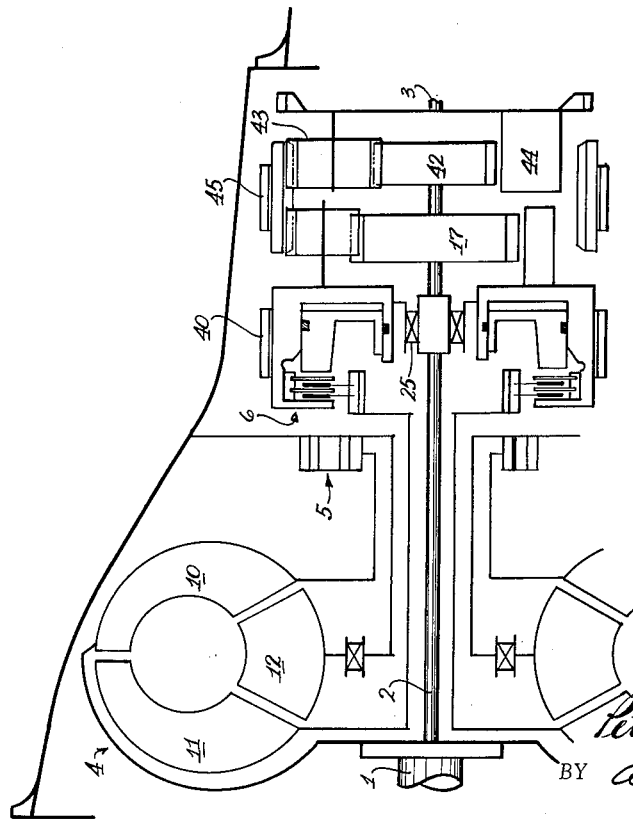

_United States Patent Office_ 3,099,171
Patented July 30, 1963

3,099,171
AUTOMATIC TRANSMISSION
Peter Ivanchich, 924 N. Rosevere St., Dearborn, Mich.
Filed Nov. 2, 1959, Ser. No. 850,186
4 Claims. (Cl. 74—688)

This invention relates to an automatic transmission of the torque converter and planetary gear set type for use in automotive vehicles and the like. It will be understood that the expression "torque converter" as used throughout this specification and claims includes within its scope not only a three element unit as herein illustrated but also a two element fluid coupling having a turbine and impeller.

An object of the invention is to provide an improved transmission having a forward drive speed which is infinitely variable in response to either the magnitude of the input torque from the engine or the magnitude of the output reaction torque.

Another object is to provide a transmission which is of simplified structure, compact in form, low manufacturing cost, and economical maintenance and operation.

The invention will be described with reference to the accompanying drawings, in which FIGURE 1 is a longitudinal sectional view of a transmission in accordance with the invention, FIGURE 2 is a schematic view of a modified form of transmission in accordance with the invention, FIGURE 3 is a schematic view of another modified form of transmission in accordance with the invention, and FIGURE 4 is a schematic view of still another modified form of transmission in accordance with the invention.

Referring to FIGURE 1, the transmission mechanism therein disclosed includes a drive shaft 1, an intermediate shaft 2, and a driven shaft 3, all in coaxial alignment. It will be appreciated that the drive shaft 1 is the conventional drive shaft of a vehicle or like engine, and the driven shaft 3 is adapted to be connected to the road wheels of a vehicle or other element to be driven in a usual manner.

The transmission comprises generally a torque converter 4, a hydraulic pressure pump 5, a clutch or brake unit 6, and a planetary gear set 7, all enclosed within a casing 8.

The torque converter 4 is of conventional type and includes a housing 9 enclosing a bladed impeller 10, a bladed turbine 11, and a bladed stator 12. As shown, housing 9 comprises parts 13 and 14.

The drive shaft 1 is directly connected to the impeller 10 through a disc member 15 fixed to the shaft and housing part 14 on which the impeller is fixed. The drive shaft 1 is also directly connected to the hydraulic pump 5, which is the hydraulic pressure source for the transmission, through the hub portion 16 of the housing 9. The drive shaft 1 is also directly connected to the sun gear 17 of the gear set 7 through intermediate shaft 2 which is splined at 18 to housing part 13 and with which the sun gear may be integral, as shown.

The turbine 11 is connected through the clutch or brake unit 6 to the carrier 19 of the gear set 7 through a sleeve 20 on intermediate shaft 2, clutch member 21, and clutch member 22 fixed to the carrier.

The clutch unit 6 is of conventional form and, as shown, includes a plurality of clutch plates 23 and 24. It will be apparent that any suitable clutching or braking mechanism may be employed for disconnecting the turbine from the carrier to allow the turbine to rotate freely or to allow the carrier to rotate freely through a one way clutch while the turbine is held from rotation.

The turbine 11 is also connected through shaft 2 to the outer ring of a coasting one-way clutch 25. The inner drum of clutch 25 is directly connected to drive shaft 1 through intermediate shaft 2.

The stator 12 of the torque converter is grounded to the casing 8 through a one-way clutch 26 and member 27 fixed to the casing.

The gear set 7 further includes a ring gear 28 directly fixed as by member 32 to the driven or output shaft 3, a plurality (say, three) planet gears 29 mounted on pins 30 carried by the carrier 19 and meshing with ring gear 28, and a parking gear 31 also carried by member 32.

A manually operable selector valve 33 of conventional form is arranged to direct the flow of hydraulic fluid in normal manner.

A brake band 40 is provided on clutch member 22 which is actuated in any suitable manner as by a servo cylinder by means of hydraulic fluid. The brake band actuating mechanism is not illustrated since it is conventional in automatic transmissions and forms no part of the present invention.

The operation of the transmission will now be described as follows:

_Neutral Cycle_

With the selector valve 33 placed in neutral position, flow of hydraulic fluid from clutch 6 is exhausted and therefore the clutch is in disengaged position. Thus, there is no connection from the turbine 11 to the carrier 19 of the gear set. The three elements 10, 11, 12 of the converter are free to rotate. Since the sun gear 17 is directly connected to the driving shaft 1, it drives the planet gears 29 which in turn drive the carrier 19 at a speed consistent with the ratio of the planetary gear set 7. The reaction member in this cycle is the ring gear 28 but, since the force required to rotate the gear set is small, no drive is imparted to the output shaft 3. Although the inner ring of the coasting one-way clutch 25 is directly connected to the drive shaft 1, no engagement occurs since the carrier 19, and thereby the outer ring of clutch 25, always rotates slower than the inner ring or drum of such clutch. It will be apparent that the sprags of the clutch 25 are so oriented at assembly that only the outer ring thereof can impart drive to the inner drum if the outer ring tends to rotate faster than the inner drum as will occur when coasting takes place.

_Forward Drive_

For this purpose, the input member of the transmission comprises the turbine 11 and carrier 19 assembly, the reaction member is the sun gear 17, and the output member is the ring gear 28. The selector valve is placed in drive position whereby hydraulic fluid is supplied to clutch 6 to cause engagement thereof. Thus, the turbine 11 and carrier 19 are connected. As the engine, and thereby the impeller, is accelerated, the resultant hydraulic force created by the impeller is impressed on the turbine blades to create the turbine torque, which is a certain multiplication of the engine torque. A characteristic of the turbine during impeller acceleration is to tend to couple, that is, to attain almost the speed of the impeller. That tendency of the turbine impresses the force of its torque on the planet gear pins 30 and thereby on the planet gears 29. Half of that force is impressed on the sun gear 17. The sun gear 17 is rotating with the drive shaft 1 and, therefore, it is a running reaction member. Since that part of the force which is impressed by the planet gears 29 on the sun gear 17 is in the same direction as the rotation of the sun gear (and engine shaft), it drives the engine at a torque rate consistent with the gear ratio of the planetary gear set. This drive force is therefore a feed back to the engine.

The other half of the force from the planet gears 29 is impressed upon the ring gear 28, the output member. The magnitude of the output torque is a multiple of that impressed force times the radius of the ring gear 28.

It will be understood that, if the output reaction torque is greater than the torque impressed upon the ring gear 28, then the ring gear 28 remains stationary and no output occurs. The turbine 11 and carrier 19, with its planet gears 29, will rotate at a rate consistent with the gear ratio of the planetary gear set when the sun gear 17 is running and the ring gear 28 is stationary. It is desirable that the radius of the sun gear 17 be relatively small and that of the ring gear relatively large so that the turbine rotation will be slow in relation to the impeller when the output ring gear 28 is stationary.

An important feature of the invention resides in the fact that there is a spontaneous upward gear ratio change. Thus, as the engine and, therefore, the impeller is accelerated still more to a point when the impressed torque on the ring gear 28 is greater than the output reaction torque on it, the ring gear 28 starts to rotate and an output occurs. As the output reaction torque lessens, or the impressed torque on the ring gear 28 increases, the ring gear 28 speeds up and the relative gear speeds in the planetary gear set lessen. This procedure continues until the torque converter 4 enters the coupling range which constitutes direct drive. In direct drive, there is still a small relative gear rotation due to turbine slip.

There is also a spontaneous downward gear ratio change. A downward revision of the output speed and an upward revision of the relative gear speeds in the planetary gear set occurs when the output reaction torque increases, the impressed torque on the ring gear being constant, or the output reaction torque being constant but the impressed torque on the ring gear 28 decreased.

The transmission is at stall when the output reaction torque is greater than the input torque impressed on the ring gear 28.

The transmission is idling when the output member, i.e., the shaft 3, is stationary, and the engine shaft 1 is idling. Under this condition, the turbine input torque is very small and, therefore, no drive occurs. At such time, the turbine 11, carrier 19, and planet gears 29 rotate at a rate consistent with the gear ratio of the planetary gear set when the sun gear 17 is running.

Reverse Cycle

During this cycle, the input member is sun gear 17, the reaction member is carrier 19, and the output member is ring gear 28. The selector valve 33 is placed in reverse position, in which clutch 6 is disengaged. The torque converter is inoperative and rotates freely. Hydraulic pressure fluid flows into the servo cylinder of the actuating means for brake band 40. The hydraulic fluid is free to flow back to the reservoir of the transmission through a metering or flow regulating valve, actuated by the accelerator pedal of the engine or other appropriate means. As that pedal is depressed to speed up the engine, the hydraulic fluid flow is restricted at the same rate or shut off. Therefore, the hydraulic fluid pressure acts on the servo accordingly to actuate the brake band 40, which thus retards or holds the carrier 19. The output speed is at the same rate as that at which the free rotation of carrier 19 is retarded or stopped.

Coasting

The input member is the ring gear 28. The ring gear 28, through the planet gears 29, drives the carrier 19 and, therefore, the outer ring of clutch 25. The outer ring and inner drum of this clutch are locked by the sprags thereof and, therefore, the engine is driven directly by the sun gear 17.

Referring to FIGURE 2, a somewhat modified form of the transmission illustrated in FIGURE 1 is shown. As in the previously described modification, the engine drive shaft 1 is the input power source member and is directly connected to the impeller 11 of the torque converter. The shaft 1 is also connected directly, in the manner previously described, to the hydraulic pressure pump 5, the inner drum of coasting one way sprag clutch 25 and to sun gear 17 of planetary gear set 7.

However, the turbine 11 is connected by the neutral clutch 6 to the ring gear 28 of the planetary gear set.

Operation of this modification is described as follows:

Neutral Cycle

With the selector valve 33 in neutral position, clutch 6 is disengaged and there is, therefore, no connection between turbine 11 and ring gear 28. All three elements of the torque converter are free to rotate. Since the sun gear 17 is directly connected to the shaft 1, it drives the gear set at a rate consistent with the gear ratio of the planetary gear set. Since the ring gear 28, and therefore the outer ring of clutch 25, rotates slower than the inner drum of clutch 25, the latter is not engaged.

Forward Drive

With the selector valve in drive position, clutch 6 is engaged to connect the turbine 11 and the ring gear 28 (the input member). As previously mentioned, acceleration of the engine and thereby the impeller creates a hydraulic force which, impressed on the turbine blades, creates a turbine torque which is a certain multiplication of the engine torque. The tendency of the turbine during impeller acceleration to couple with or attain almost the speed of the impeller results in impression of the force of its torque on the ring gear 28. That force, minus the reaction force, is impressed on the pins 30 of the planet gears 29 and, therefore, on the carrier 19 which is the output member. That force times the mean radius of the path of revolution of the planet pins 30 of the carrier 19 is the torque multiplication of the gear set. The reaction force acting on the sun gear 17 (the reaction member), being in the direction of engine shaft rotation, is a feed back to the engine.

If the magnitude of the reaction torque on the output member carrier 19 is greater than the output torque on the carrier, then it remains stationary. The turbine 11, ring gear 28, planet gears 29, will rotate at a rate consistent with the ratio of the planetary gear set when the sun gear 17 is running and the carrier 19 is stationary.

It is desirable that the gear ratio be such that the turbine will rotate slowly in relation to the impeller when the carrier is stationary.

As before, there is a spontaneous upward gear shift. As the engine and the impeller is accelerated to a point where the impressed torque on the carrier 19 is greater than the reaction on it, the carrier will start to rotate and then an output occurs. As the output reaction lessens or the impressed torque on the carrier 19 increases, the output member or carrier speeds up and the relative gear speeds in the planetary gear set lessen. This continues until the torque converter 4 reaches coupling range, which is direct drive.

There is also a spontaneous downward gear shift, which is the reverse of the upward shift. A downward revision of the output speed, and an upward revision of the relative gear speeds in the planetary gear set, occurs when the reaction impressed torque on the carrier 19 is constant, or the reaction acting on the carrier (output member) is constant, but the impressed torque on it decreases.

The transmission is at stall when the reaction force acting on the carrier 19 is greater than the torque impressed upon it from the turbine and gear set.

*Reverse Cycle*

The input member is the sun gear 17, the output member is the carrier 19, and the reaction member is the ring gear 28.

The selector valve is placed in reverse position whereby the clutch 6 is disengaged and the reverse brake band 40 is engaged. The ring gear 28 is held stationary.

*Coasting Cycle*

The input member is the carrier 19. The outer ring of the clutch 25 is driven by the ring gear 19 against the sprags of clutch 25 which locks the latter. Thus, the engine is driven positively at a 1.0:1.0 ratio.

Another modification of the invention is illustrated in FIGURE 3, by way of example.

In this modification, a second planetary gear set 41 is provided, such gear set comprising a sun gear 42 fixed to intermediate shaft 2, and planet gears 43 meshing with sun gear 42 and carried by a carrier 44. Ring gear 28 also meshes with planet gears 43 and is, therefore, common to both gear sets. A coasting brake band 45 is provided on ring gear 28.

As before, the drive shaft 1 is directly connected to the impeller member of the torque converter. It is also directly connected to the hydraulic pressure pump 5, the inner drum of the coasting one way sprag clutch 25, and sun gears 17 and 42 of the planetary gear sets. The turbine 11 is connected by neutral clutch 6 to carrier 19 of the first set.

The operation is as follows:

*Neutral Cycle*

With the selector valve in neutral position, the clutch 6 disengages. There is no connection between the turbine 11 and the carrier 19 of the first gear set. All three elements of the torque converter 4 are free to rotate.

Since the sun gears 17 and 42 are directly connected to the engine shaft 1, sun gear 42 (carrier 44 being stationary), to the planet gears 43, the ring gear 28 and the planet gears 29 drive carrier 19 forward at a slower rate than that of the inner drum of the clutch 25. The sprags of the clutch 25 are so oriented that engagement of the clutch occurs only when the outer ring thereof tends to rotate faster than the inner drum, which, however, occurs only in coasting or push starting of the engine.

*Forward drive*

With the selector valve in drive position, clutch 6 engages to connect the turbine 11 and the carrier 19 (the input member).

As before, the tendency of the turbine to couple with the impeller impresses the force of its torque on the planet gear pins 30 of carrier 19 and thereby on the planet gears 29. Half of that force is impressed on sun gear 17 (the first reaction member) in the direction of engine rotation. The other half of that force is impressed, through ring gear 28 and planet gears 43, on the planet gear pins of carrier 44, the output member. The reaction member of the second gear set is sun gear 42, and the direction of the reaction force acting upon it is opposite to that of engine rotation. The difference of the opposing reaction forces is a feed back to the engine.

It will be understood that, if the magnitude of the reaction torque on the output member is greater than the output torque of the gear sets, carrier 44 remains stationary and no output occurs. The turbine and carrier 19, with planet gears 29 and ring gear 28 will rotate at a rate consistent with the gear ratios of the two planetary gear sets when the sun gears are running and carrier 44 is stationary.

It is desirable that the gear ratios be such that the turbine will rotate slowly relatively to the impeller when the carrier 44 is stationary.

There is again a spontaneous upward shift. As the engine and impeller are accelerated to the point where the impressed torque on the carrier 44 is greater than the reaction on it, the carrier 44 will start to rotate, when out put occurs. As the output reaction lessens or the impressed torque on the carrier 44 increases, the carrier 44 speeds up and relative gear speds in the gear sets lessen. This continues until the torque converter 4 gets into coupling range, which is direct drive.

The spontaneous downward shift is a reverse of the upward shift. A downward revision of the output speed and an upward revision of the relative gear speeds in the gear sets occur when the output reaction torque increases, the impressed torque on carrier 44 being constant or the output reaction torque being constant, but the impressed torque on carrier 44 decreased.

The transmission is at stall when the output reaction torque is greater than the torque impressed on carrier 44.

*Reverse Cycle*

The input member is the sun gear 17. Input is through the planet gears 29 and ring gear 28 to carrier 44. The reaction members are carrier 19 and sun gear 42.

The selector valve is placed in reverse position to disengage clutch 6 and engage brake band 40. The carrier 19 is held stationary. Therefore, reverse drive is imparted to carrier 44.

*Coasting Cycle*

The input member is carrier 44. Ring gear 28 is held by brake band 45, which is actuated in any conventional manner. The outer ring of clutch 25 locks with the inner drum thereof and thus the engine is driven positively.

Referring to FIGURE 4, another modified form of transmission is illustrated. As in FIGURE 1, the engine drive shaft 1 is the input power source member and is directly connected to the impeller 10. The shaft 1, is also connected directly, in the manner previously described, to the hydraulic pump 5, the inner drum of coasting one way sprag clutch 25 and to sun gear 17 of the fiirst planetary gear set 7, and to the sun gear 46 of a second planetary gear set 47. The turbine 11 is connected, by the neutral clutch 6, to the carrier of the first planetary gear set, as in FIGURE 1. The ring gear 28 of the first planetary gear set is connected, directly, to the carrier 49 of the second planetary gear set, and to the output shaft 3. The ring gear 48 of the second planetary gear set is connected to the inner drum of the one way sprag clutch 50. The operation of this modificaiton is described as follows:

*Neutral Cycle*

The selector valve is placed in the neutral position, clutch 6 disengaged and there is therefore no connection between turbine 11 and carrier 19. All three elements of the torque converter are free to rotate. Since the sun gears 17 and 46 are directly connected to the shaft 1, sun gear 17 drives the gear sets 7 and 47 at a rate consistent with the gear ratios thereof, when ring gear 28 of the first gear set and carrier 49 of the second gear set are stationary. The sprags of the one way clutch 25 are so oriented at assembly that one way clutch 25 engages only in coasting. Ring gear 48 of the second gear set is free to rotate as it is not held by brake band 51.

*Forward Drive*

With selector valve in drive position, clutch 6 is engaged, connecting the turbine 11 and carrier 19.

During the initial part of the drive cycle if the reacting torque on the output member 49 is greater than the input torque (from the turbine 11, through the first gear set) impressed on it by ring gear 28, then sun gear 46 is the positive input member to the second gear set 47, ring gear 48 is the reaction member and carrier 49 is the output member. With the selector valve in the forward drive position hydraulic pressure fluid flows into the servo cylinder of the actuating means for brake band 51. That band engages the outer ring of one way brake 50. The sprags of one way brake 50 are so oriented at assembly that engagement occurs and ring gear 48 held only when it tends to turn counter enginewise. To eliminate engagement shock, and to initiate forward drive, the hydraulic pressure fluid that flows into band 51 actuating servo cylinder, is free to flow back to the reservoir of the transmission through a metering or flow regulating valve, actuated by the accelerator pedal of the engine or other appropriate means. As that pedal is depressed to accelerate the engine, the hydraulic fluid flow is restricted at the same rate or shut off. Therefore, the hydraulic fluid pressure acts on the servo cylinder accordingly to actuate the brake band 51 and thus retards or holds brake band 51. The resultant output speed is at a rate that is consistent with the gear ratio of the second gear set, when ring gear 48 is held. As the reaction torque on output member 49 lessens, and the turbine impressed torque (through the first gear set on ring gear 28) is greater than said reaction torque, the drive is through the first gear set. Ring gear 48 rotates engine directionwise, the one way brake disengages, the second gear set is rotating as a unit and does not perform work. The rest of the operation of this cycle is the same as set out and described relative to FIGURE 1.

*Reverse Cycle*

During this cycle the input member is sun gear 17, the reaction member is carrier 19, the output member is ring gear 28. The selector valve 33 is placed in the reverse position in which neutral clutch 6 and reaction brake band 51 actuating servo cylinder are disengaged. The torque converter is inoperative and rotates freely.

Hydraulic fluid flows into the reverse servo, the actuating means for brake band 40.

The hydraulic fluid is free to flow back to the reservoir of the transmission through the aforementioned metering or flow regulating valve actuated by the acceleration pedal of the engine, or other means. As that pedal is depressed to speed up the engine, the hydraulic fluid flow is restricted or shut off accordingly.

Therefore the hydraulic fluid pressure acts on the reverse servo accordingly to actuate the reverse brake band 40 which thus retards or holds the carrier 19. The output speed is at the same rate as that at which the free rotation of carrier 19 is retarded or stopped. The second gear set is inoperative.

*Coasting*

The second gear set is inoperative, neutral clutch 6, engaged. The input is ring gear 28, through the planet gears 29, drives carrier 19 and therefore the outer ring of clutch 25. The outer ring and inner drum of this clutch are locked by the sprags, therefore the engine is driven directly.

It will be understood that various additional modifications of the invention may be provided within the ambit of the present invention, the four modifications described being illustrative by way of example.

It will be apparent that there has been provided a transmission having an infinitely variable forward drive speed in which the turbine of a standard torque converter acts as an input member and the drive shaft is in effect the reaction member. It will, however, be understood that the reverse of this procedure would also be feasible, wherein the engine acts as the input member through the gear elements connected thereto and the turbine acts as the reaction member through the gear elements connected thereto. As a result, a much simplified construction is rendered possible with consequent lower cost of manufacture more efficient operation and a minimum or no maintenance required.

I claim:

1. In a transmission, a housing, an input shaft rotatably mounted in said housing, an output shaft rotatably mounted in said housing in aligned relation with said input shaft, a coupling device having at least an impeller and a turbine, means connecting said impeller to said input shaft, a planet gear set embodying an outer ring gear connected to said output shaft, an inner sun gear connected to said input shaft and a plurality of planet gears each having its teeth in mesh with the teeth of said sun and ring gears, a carrier for said planet gears connected to said turbine and driven directly thereby, said connection to the output shaft embodying a second set of planet gears having a sun gear, a ring gear and planet gears, the sun gear of the second set being connected to said input shaft and the carrier thereof connected to the ring gear of the first planet gear set and to the output shaft, and brake means connected to the ring gear of said second planet gear set.

2. In a transmission, a housing, an input shaft rotatably mounted in said housing, an output shaft rotatably mounted in said housing in aligned relation with said input shaft, a coupling device having at least an impeller and a turbine, means connecting said impeller to said input shaft, a planet gear set embodying an outer ring gear connected to said output shaft, an inner sun gear connected to said input shaft and a plurality of planet gears each having its teeth in mesh with the teeth of said sun and ring gears, a carrier for said planet gears connected to said turbine and driven directly thereby, said connection to the output shaft embodying a second set of planet gears having a sun gear, a ring gear and planet gears, the sun gear of the second set being connected to said input shaft and the carrier thereof connected to the ring gear of the first planet gear set and to the output shaft, brake means connected to the ring gear of said second planet gear set, and a one way clutch operatively connected between said output shaft and said input shaft for producing a drive from the former to the latter shaft when a vehicle employing the transmission is coasting.

3. In a transmission, a housing, an input and an output shaft rotatably mounted in said housing, a coupling device having at least an impeller and a turbine, means connecting the impeller to said input shaft, a planet gear set having a ring gear element, pinion gears and a carrier element and a sun gear element, said turbine driving an element of said planet gear set, a second element of said set being connected to and driving said output shaft, the third element of said set applying a reaction force to the operation of the other two elements of the set to said input shaft and impeller in the same direction of rotation thereof to increase the applied torque over that produced by the input shaft, an overrunning clutch operatively connected between said input shaft and said output shaft, effective to lock the shafts together when the output shaft overruns the input shaft, and means for locking said carrier element for producing a reversal in the direction of operation of said output shaft.

4. In a transmission, a housing, an input shaft rotatably mounted in said housing, an output shaft rotatably mounted in said housing in aligned relation with said input shaft, a coupling device having at least an impeller and a turbine, means connecting said impeller to said input shaft, a planet gear set embodying an outer ring gear connected to said output shaft, an inner sun gear connected to said input shaft and a plurality of planet gears each having its teeth in mesh with the teeth of said sun and ring gears, a carrier for said planet gears connected to said turbine and driven directly thereby, and an overrunning clutch operatively connected between said shafts for engaging and providing a drive to the input shaft when the output shaft becomes a driving member.

References Cited in the file of this patent

UNITED STATES PATENTS

| | | |
|---|---|---|
| 2,284,934 | Watson | June 2, 1942 |
| 2,290,319 | Dodge | July 21, 1942 |
| 2,416,312 | Hanson | Feb. 25, 1947 |
| 2,534,104 | Chiville | Dec. 12, 1950 |
| 2,685,169 | Saives | Aug. 3, 1954 |
| 2,736,407 | Smirl | Feb. 28, 1956 |
| 2,749,773 | Simpson | June 12, 1956 |
| 2,860,526 | Dodge | Nov. 18, 1958 |
| 2,890,600 | Smirl et al. | June 16, 1959 |
| 2,890,601 | Forster | June 16, 1959 |
| 2,969,694 | Harmon et al. | Jan. 31, 1961 |

FOREIGN PATENTS

| | | |
|---|---|---|
| 393,294 | Great Britain | May 30, 1933 |
| 101,487 | Australia | July 15, 1937 |
| 1,036,066 | Germany | Aug. 7, 1958 |